US007921457B2

(12) United States Patent
Skemer (10) Patent No.: US 7,921,457 B2
(45) Date of Patent: Apr. 5, 2011

(54) DISTRIBUTED SUBSCRIBER MANAGEMENT SYSTEM

(75) Inventor: Terry Skemer, Ottawa (CA)

(73) Assignee: Alcatel Lucent, Paris (FR)

( * ) Notice: Subject to any disclaimer, the term of this patent is extended or adjusted under 35 U.S.C. 154(b) by 416 days.

(21) Appl. No.: 12/132,583

(22) Filed: Jun. 3, 2008

(65) Prior Publication Data

US 2009/0319777 A1    Dec. 24, 2009

Related U.S. Application Data

(60) Division of application No. 11/514,852, filed on Sep. 5, 2006, now Pat. No. 7,512,784, which is a continuation of application No. 09/755,037, filed on Jan. 8, 2001, now abandoned.

(30) Foreign Application Priority Data

| Jan. 7, 2000 | (CA) | ..................... 2293989 |
| Jan. 14, 2000 | (CA) | ..................... 2296213 |

(51) Int. Cl.
*G06F 7/04* (2006.01)
*G06F 15/16* (2006.01)
*G06F 15/173* (2006.01)
*G06F 17/30* (2006.01)
*H04L 29/06* (2006.01)

(52) U.S. Cl. ............ 726/12; 709/226; 713/155; 713/170

(58) Field of Classification Search .................. 709/226; 726/12; 713/155, 170
See application file for complete search history.

(56) References Cited

U.S. PATENT DOCUMENTS

| 6,067,623 | A  | * | 5/2000 | Blakley et al. ................... 726/5 |
| 6,212,561 | B1 | * | 4/2001 | Sitaraman et al. ............ 709/225 |
| 6,219,790 | B1 | * | 4/2001 | Lloyd et al. ..................... 726/14 |
| 6,298,383 | B1 | * | 10/2001 | Gutman et al. ................ 709/229 |
| 6,405,251 | B1 | * | 6/2002 | Bullard et al. ................ 709/224 |
| 6,459,682 | B1 | * | 10/2002 | Ellesson et al. ............... 370/235 |
| 6,463,474 | B1 | * | 10/2002 | Fuh et al. ...................... 709/225 |
| 6,466,977 | B1 | * | 10/2002 | Sitaraman et al. ............ 709/225 |
| 6,539,482 | B1 | * | 3/2003 | Blanco et al. .................... 726/7 |
| 6,584,122 | B1 | * | 6/2003 | Matthews et al. ............. 370/493 |

OTHER PUBLICATIONS

Corbi, Cecilia et al. "A Directory Enabled Solution for Internet Roaming", 1999 IEEE.*
Metz, Christopher. "AAA Protocols: Authentication, Authorization, and Accounting for the Internet", 1999, IEEE.*

* cited by examiner

*Primary Examiner* — Michael J Simitoski
(74) *Attorney, Agent, or Firm* — Victoria Donnelly (57) ABSTRACT

A distributed subscriber management system and method that controls access to a network preventing unauthorized traffic through the access network and providing centralized access control between user networks are disclosed. The controlled access is provided through the use of one of several technologies including user authentication, using PAP, CHAP, RADIUS, TACACS+. The method includes the steps of receiving a connection request from a user located on one of the User Networks; interrogating the user for userid and password information; encrypting the userid and password information; transmitting the encrypted information, via the access network, to an authentication server attached to one of a plurality of external networks; decrypting the information at the authentication server; and transmitting an authentication message from the authentication server of the external network to the access control node via the access network. Additionally, the method includes the step of challenging all data leaving the access control node.

17 Claims, 6 Drawing Sheets

DISTRIBUTED SUBSCRIBER MANAGEMENT SYSTEM

RELATED APPLICATIONS

This application is a divisional application of U.S. application Ser. No. 11/514,852 filed on Sep. 5, 2006 now U.S. Pat. 7,512,784, which in turn, is a continuation of U.S. application Ser. No. 09/755,037 filed Jan. 8, 2001, now abandoned, which claims the benefit of foreign priority applications filed in Canada as Application Numbers 2,296,213 filed on Jan. 14, 2000 and 2,293,989 filed on Jan. 7, 2000.

FIELD OF THE INVENTION

This invention relates to the management of user access rights on networks, and is particularly concerned with the distribution of resources used to authenticate and authorize users while allowing for accounting activities on user access to provided facilities.

BACKGROUND OF THE INVENTION

Typically, in the interoperation of various networks, a user is challenged to provide access control information, such as user identification and password, by a system residing at the gateway between the two networks. In the event that a user is denied access to the next portion of the network, all of that user's packets can be discarded, or the user can be re-challenged to provide access control information. This scheme is common in the art. Although this authorization scheme does succeed in preventing unauthorized access it allows unauthorized traffic to fully traverse the first network before it is discarded. This generates unnecessary traffic which is transmitted over the first network consuming precious bandwidth.

Authorization for such schemes is provided through the use of systems like the Remote Authentication Dial-In User Service (RADIUS) protocol. RADIUS is a fully open protocol, distributed as source code, known in the art, which is a client/server system designed to prevent unauthorized access to networks. RADIUS clients run on network devices and send authentication requests to a central RADIUS server that contains both user authentication information and network access rights. RADIUS can be modified to work with any common security system. Common implementations for RADIUS include networks with multiple vendor access servers such as an Internet Protocol (IP) based network, where dial-in users can be authenticated through a RADIUS server customized to work with the KERBEROS security system, a common security system on-UNIX® like computer networks. Other common implementations include networks in which a user is permitted access to a particular service.

In this type of implementation a user could be restricted to a single utility, such as telnet, or a single server, or even a single protocol. This would permit RADIUS to identify a certain user as having access only to Point-to-Point-Protocol (PPP) using an IP address in a given range using only one service such as telnet or File Transfer Protocol (FTP).

RADIUS follows a client-server operational model. A Network Access Server (NAS), Remote Access Server (RAS), or the like, operates as a client of RADIUS. The client is responsible for passing user information to designated RADIUS servers, and then acting on the response that is returned. RADIUS servers are responsible for receiving user connection requests, authenticating the user, and then returning all configuration information necessary for the client to deliver service to the user. A RADIUS server can act as a proxy client to other RADIUS servers or other kinds of authentication servers.

RADIUS is carried in UDP (Port number 1812 decimal) and IP data units. At times, the source IP address field in client requests is zero since the client may not yet have an address, in which case the RADIUS system will allocate an address to the user from a pool of unused network addresses.

When a user attempts to login, the following steps occur to authenticate the user with RADIUS:

1. The user is prompted for and enters a username and password.
2. The username and encrypted password are sent over the network to the RADIUS server.
3. The user receives one of the following responses from the RADIUS server:
   ACCEPT (The user is authenticated)
   REJECT (The user is not authenticated and is prompted to re-enter the username and password, or access is denied)
   CHALLENGE (A challenge is issued by the RADIUS server to collect additional data from the user)
   CHANGE PASSWORD (A request is issued by the RADIUS server, asking the user to select a new password)

RADIUS authentication must be performed before RADIUS authorization. The ACCEPT or REJECT response contains additional data that is used for EXEC or network authorization. The additional data included with the ACCEPT or REJECT packets consists of services that the user can access, including Telnet, rlogin, PPP, FTP, EXEC services, or connection parameters, including the host or client IP address, access list, and user timeouts.

User IP addresses can be statically provisioned or dynamically assigned using RADIUS or the like. In RADIUS, the ACCEPT or REJECT response contains the host or client IP address, access list, and user timeouts. Upon a user timeout, the user may be disconnected and if dynamically assigned, the IP address is returned to a pool of available addresses. BootP, DHCP, and TACACS+ can also be used to dynamically assign IP addresses to users but these protocols are less common than RADIUS.

Normally, a pool or group of addresses are pre-assigned by a network administrator and given out by the RADIUS server as users sign-on to the service provider. Typically used to oversubscribe IP addresses, a pool allows many clients to share a small number of IP addresses based on usage and contention patterns.

The Boot Protocol (BootP) is a UDP-serviced protocol that can be IP-routed to a BootP address server. Through the BootP protocol, the server can do many functions including IP address assignment, bootstrapping, operating system loading, desktop configuration, and hardware/interface configuration. BootP does not completely replace RADIUS as a subscriber management protocol. Dynamic Host Configuration Protocol (DHCP) is a newer alternative to BootP and possesses all the capabilities of BootP. As a rule, any BootP relay Agent (e.g., in a router or gateway) will work with DHCP. As with BootP, DHCP does not completely replace RADIUS as a subscriber management protocol.

Figure 1:
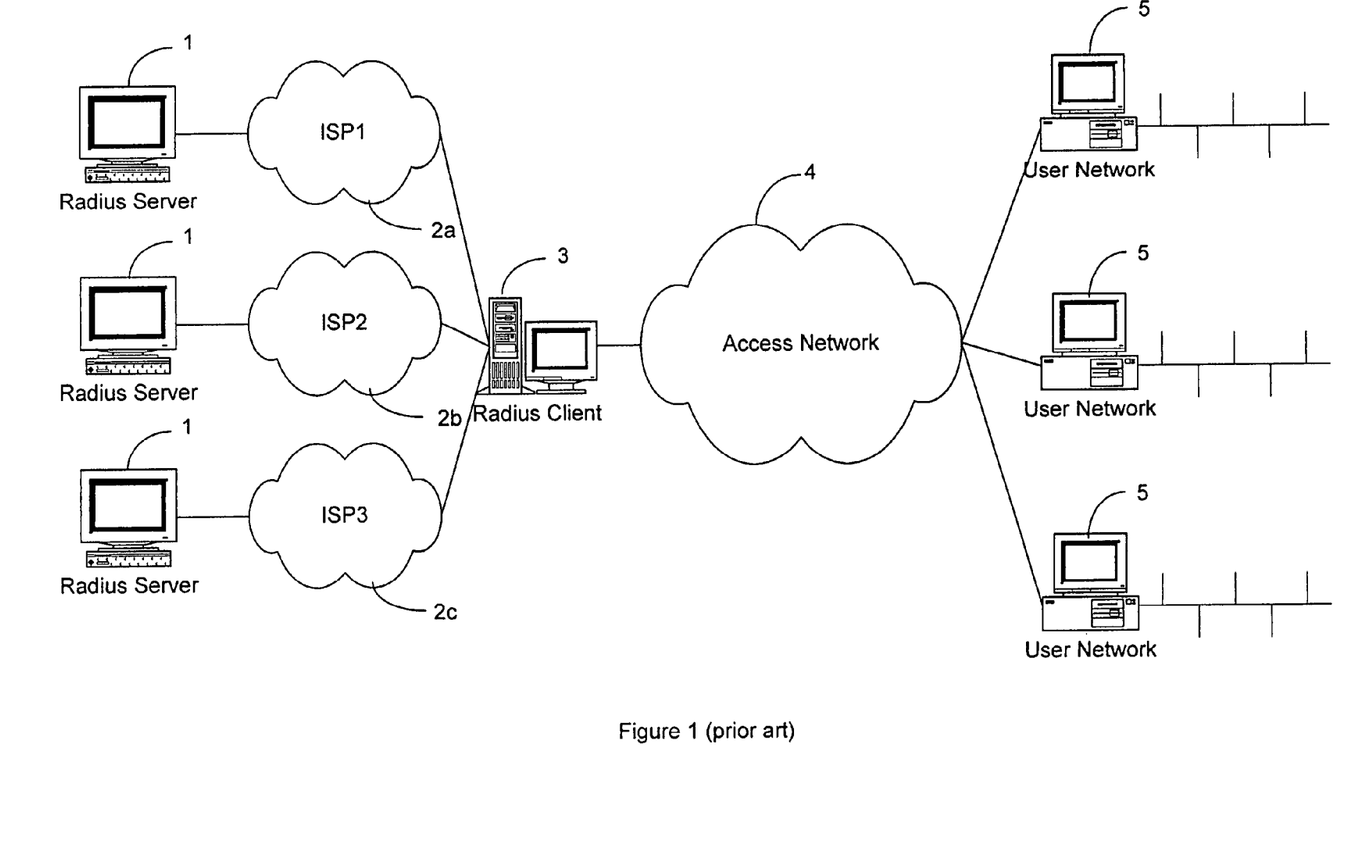
FIG. 1 is a schematic diagram of an authentication scheme known in the art.

An example of a known authentication scheme is depicted in FIG. 1. Here different User Networks 5 are connected to an Access Network 4, which in turn has a RADIUS clients at an egress edge. This RADIUS client 3 serves to ensure that only data with the correct authorization is allowed to go to the various ISP hosted networks 2a-2c. If a packet is not authorized it is discarded at the RADIUS client 3. To obtain the authorization, the RADIUS client 3 forms a connection to the RADIUS server 1 attached to the target ISP network which the packet is trying to enter. After forming this connection to the RADIUS server 1, the RADIUS client 3 can determine whether the user who initiated the packet transmission has authorization to transmit packets onto the target network. In such an implementation, the RADIUS client only controls access to the ISP hosted networks 2a-2c, while not controlling access to the Access Network 4, or between the User Networks 5. Thus, it is left to the administrators of the various User Networks 5 to ensure their own security and prevent admission of users from other User Networks 5 to systems to which those users should not have access.

Because data fully traverses the Access Network 4 before authorization is obtained, bandwidth on the Access Network 4 is needlessly consumed by transmissions that fail authentication. The unnecessary unauthorized traffic traversing the Access Network 4 can be problematic if there are restrictions on the available bandwidth, or if traffic is heavy. It would be desirable to stop this traffic as it enters the access network 4, so as to reduce loading problems. Moreover, the lack of centralized access control between the User Networks 5 is also undesirable.

Figure 2:
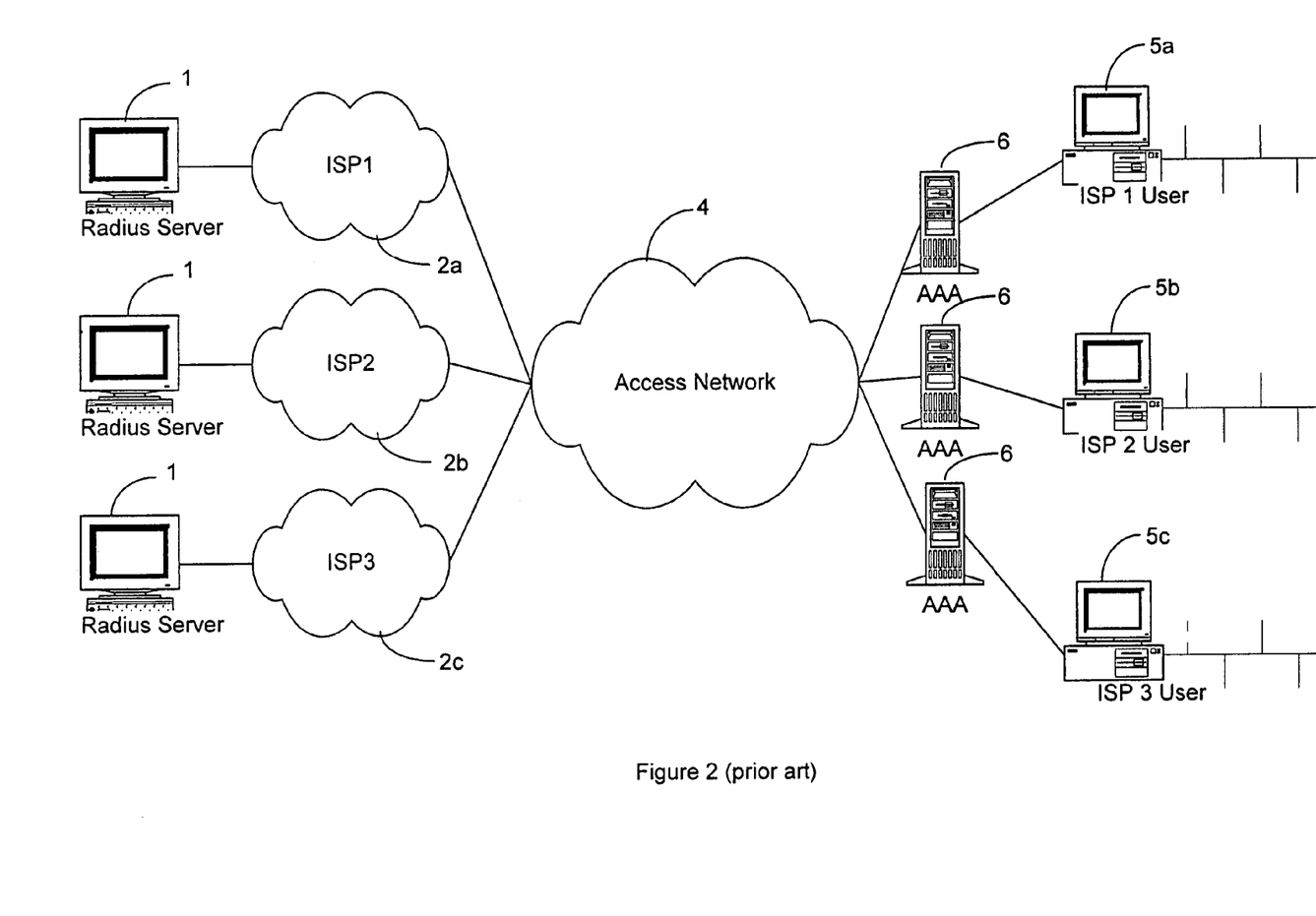
FIG. 2 is a schematic diagram of another authentication scheme known in the art.

One system addressing the problem of unnecessary traffic has been offered by CISCO Systems in the form of their Authentication, Authorization and Accounting (AAA) software. AAA acts to verify the authorization of a packet to enter an external network prior to entry of the packet into the access network. AAA also seeks to distribute the subscriber management features of the RADIUS client. Distributed subscriber management (DSM) provides a more fault tolerant implementation than a single RADIUS client does. However, in order to offer this service, a AAA client can only be attached to one User Network, since when multiple User Networks are connected to the same AAA client, one User Network, without challenge by the AAA system, could gain access to another User Network connected to the same AAA system. An example of an implementation known in the art and using AAA is found in FIG. 2. In that implementation, RADIUS Servers 1 are attached to ISP networks 2a-2c, a multitude of such networks are, in turn, connected to an Access Network 4. The Access Network 4 connects to a multitude of User Networks 5a-5c through AAA routed systems 6. Each User Network 5a-5c has its own AAA routed system 6 thus preventing one User Network 5a, 5b, or 5c from gaining access to another ISP User Network 5a, 5b, or 5c. The AAA system 6 is used to verify the authorization of the packets with the RADIUS Server 1, and will discard any user packets that do not have the correct authorization. Unfortunately this requires a different AAA system 6 for each ISP User Network 5a-5c that is connected to the Access Network 4, which can greatly add to the cost of a network.

Alternatives to RADIUS do exist, providing DSM systems with the option of implementing another type of security system. One of the alternatives to RADIUS is Terminal Access Controller Access Control System (TACACS). Three distinct versions of TACACS exist. The first is TACACS, which was the original product that provided password checking and authentication, as well as notification of user actions for security and accounting purposes. This original system is now considered obsolete. The second version is Extended TACACS, which is an extension to the older TACACS protocol that provides information about protocol translator and router information that can be used in UNIX like systems for auditing trails and accounting files. Extended TACACS is also now considered to be obsolete. TACACS+ is a recent protocol that provides detailed accounting information and flexible administrative control over authentication and authorization processes. TACACS+ is facilitated through Authentication, Authorization and Accounting (AAA) and can be enabled only through AAA commands. A full description of the implementation of TACACS+ can be found in a draft Request For Comment (RFC) 1492. For the purposes of simplicity all three TACACS implementations will be referred to as TACACS in this document, and it should be understood that any derivative of such a system can be substituted for TACACS. PPP is used to carry IP over dial configurations and supports both Password Authentication Protocol (PAP) and Challenge Handshake Authentication Protocol (CHAP) as methods of password transfer. PPP has been modified to support numerous always-on access technologies including PPP over ATM (PPPoA), PPP over Frame Relay (PPPoF), and PPP over Ethernet (PPPoE).

With the creation of Competitive Local Exchange Carriers (CLECs) it is common to find a company which is delivering telephony over packet based networks and supplying clients with data based services. In addition, if there are two clients in close physical proximity to each other it would be advantageous to connect them to a common access network so that there is a single connection to the CLEC. However, this single connection to the CLEC is only feasible if a stronger user authorization scheme is implemented. Thus, a need exists in the art for an improved user authentication and authorization system.

SUMMARY OF THE INVENTION

It is an object of this invention to provide a DSM system and method that obviates or mitigates at least one disadvantage of previous systems and methods. In particular, the present invention provides a DSM system and method that controls access to a network to prevent unauthorized traffic through the access network and provides centralized access control between user networks. Other features of the invention can include providing a DSM system which allows set-up, maintenance, and tear-down of the user connection, allows users to choose their destination as opposed to tying a user to a single destination, and provides for the administration of the assignment and release of network addresses.

The DSM system of the invention preferably allows for at least one of several technologies including facilities for the enforcement of service levels as defined in Service Level Agreements, facilities for resource management and facilities for billing by a service provider through the collection of statistics and accounting data. Moreover, the system of the invention preferably alerts service providers of system problems through the use of alarm reporting.

In a first aspect, the present invention provides a distributed subscriber management method. This method allows a user network to perform user authentication for an external network at an access control node, such as an integrated access device, the external network being connected to the access control node by means of an access network. The method includes a first step of receiving a data unit at an access control node that is connected to a plurality of user networks. The second step is to determine whether the data unit requires authentication. The third step is to authenticate the determined data unit. The fourth step is to determine that the authenticated data unit is eligible for transmission. The step of authenticating may include any combination of interrogating the user for access information, transmitting the access information to an authentication server on an external network, and transmitting an authentication message from the authentication server to the access control node. Both the transmitting of the access information to an authentication server and the transmitting of an authentication message may be preceded by a step of encrypting the message, and then decrypting it after transmission. The authentication server of the external network may optionally employ one of the following protocols: remote authentication, dial-in user service protocol (RADIUS), password authentication protocol (PAP), challenge handshake authentication protocol (CHAP), and terminal access controller access control system (TACACS). The distributed subscriber management method of the first aspect of the present invention may also include the step of packet labelling the data units at the access control node. Optionally, after the step of determining that the authenticated data unit is eligible for transmission, the steps of the contents of the authentication message at the access control node; dropping the data unit if the contents indicate rejection; examining the authentication message for authenticity; and collecting statistical usage information at the access node may be performed.

In accordance with a second aspect of the present invention there is provided an integrated access device, for placement between a user network and an external network, the external network having an access rights authentication server. The integrated access device is comprised of a user network interface for operatively connecting to a plurality of user networks to receive data units from the plurality of user networks, an authentication agent, operatively connected to the user network interface for authenticating, authorising and forwarding data units received from the plurality of user networks and an external network-interface, operatively connected to the authentication agent, for forwarding data units authorised by the authentication agent to an external network. In one embodiment of the second aspect of the present invention the user network interface includes a plurality of ingress cards and the external network interface includes an egress card. In other embodiments the authentication agent may include a combination of a local authorization table for authorising data units, network address assignment and release means, service level enforcing means, network resource management means, statistical usage collection means, and alarm monitoring means. In further embodiments of the second aspect of the present invention the authentication client includes a combination of a PAP client, a CHAP client, a TACACS client or a RADIUS client.

BRIEF DESCRIPTION OF THE DRAWINGS

The invention will now be described in more detail by way of example only and with reference to the attached drawings, wherein.

DETAILED DESCRIPTION OF THE INVENTION

Figure 5:
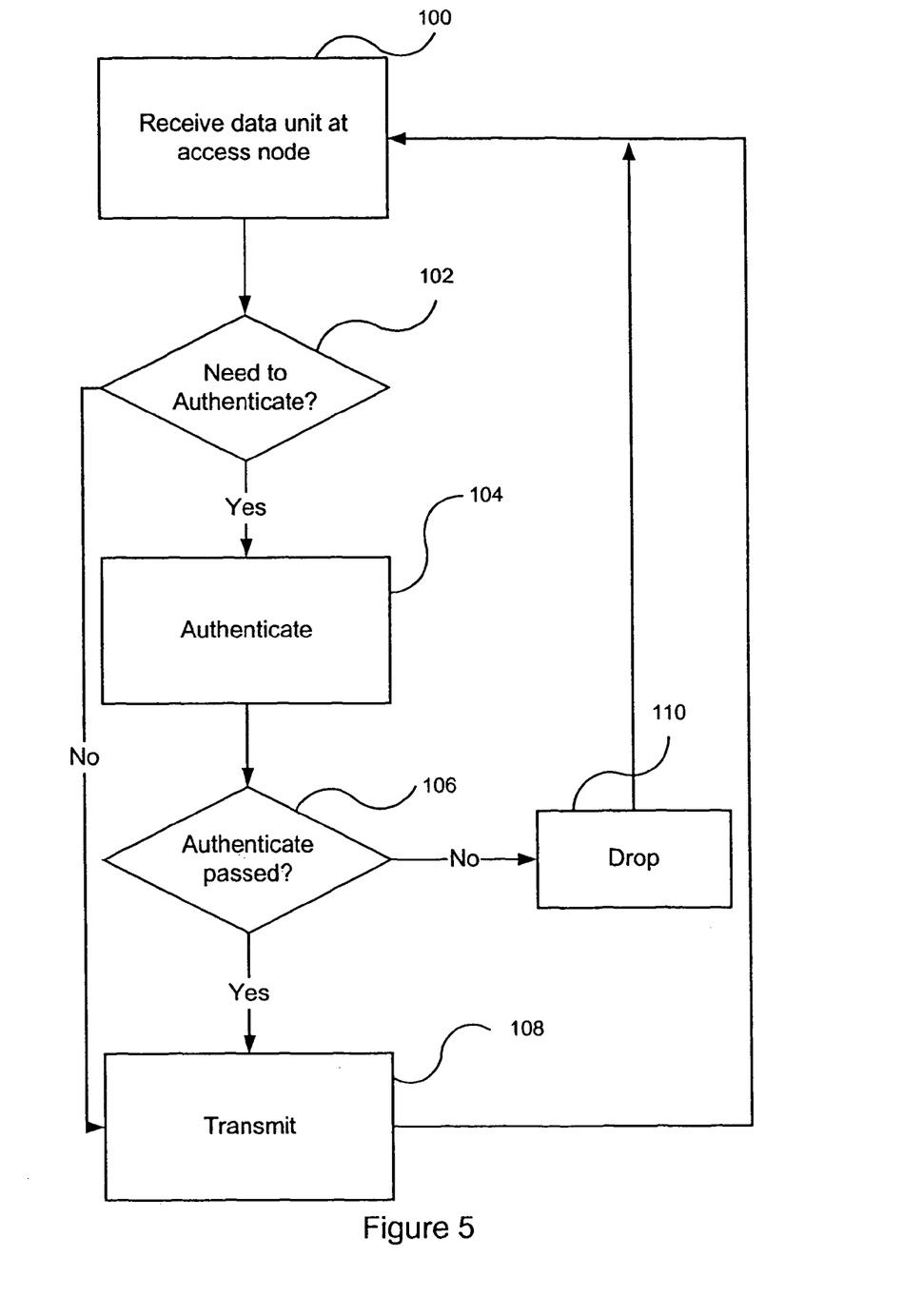
FIG. 5 is an overview of a DSM method of the present invention.

A Distributed Subscriber Management system and method are disclosed which control access to a network, preventing unauthorized traffic through an access network and provide centralized access control between user networks. The system, in accordance with the invention, provides controlled access through the use of one of several technologies including user authentication, using PAP, CHAP, RADIUS, TACACS, or other standard authentication means. The preferred system allows set-up, maintenance, and tear-down of the user connection and allows users to choose their destination as opposed to tying a user to a single destination. The system also preferably provides for the administration of the assignment and release of network addresses. The invention also provides a Distributed Subscriber Management (DSM) method for performing user authentication for an external network at an access control node, which external network is connected to, by means of an Access Network, while the access control node is connected to a plurality of User Networks. The method can include the steps of receiving a connection request from a user located on one of the User Networks; interrogating the user for access control information such as user identification and password; optionally encrypting the userid and password information; transmitting the optionally encrypted information, via the Access network, to an authentication server attached to an external network; decrypting the information, if necessary, at the authentication server; and transmitting an authentication message from the authentication server of the external network to the access control node via the Access Network. The preferred method includes the additional step of challenging all data leaving the access control node. The authentication server of the external network normally employs one of Radius, PAP, CHAP, and TACACS. A more detailed description of the method of the present invention is provided later in a description of FIG. 5.

The following terms and acronyms are used in the following description:
DSM Distributed Subscriber Management
RADIUS Remote Authentication Dial-In User Service
IP Internet Protocol
PPP Point-to-Point Protocol
FTP File Transfer Protocol
TACACS Terminal Access Controller Access Control System
AAA Authentication, Authorization, Accounting
PAP Password Authentication Protocol
CHAP Challenge Handshake Authentication Protocol
PPPoA PPP over ATM
ATM Asynchronous Transfer Mode
PPPoE PPP over Ethernet
PPPoF PPP over Frame Relay
CLEC Competitive Locale Exchange Carrier
ISP Internet Service Provider
IAD Integrated Access Device
QoS Quality of Service
VPN Virtual Private Network
ISDN Integrated Services Digital Network
UDP/IP User Datagram Protocol/Internet Protocol
L2TP Layer 2 tunneling protocol such as IP over PPP over UDP/IP
L2F layer 2 forwarding such as IP over PPP over IP
IPSec Secure Internet Protocol
VPN IP over PPP over IPSec
BootP Boot Protocol
DHCP Dynamic Host Configuration Protocol
SNMP Simple Network Management Protocol
CLI Command Line Interface
MAC Media Access Control
SIP Service Interworking Platform In order to provide secure Distributed Subscriber Management (DSM) in an efficient manner so as to allow multiple end user networks to co-exist with a single connection to the central network, while providing security to those users, it is necessary to consider various aspects of DSM, including: location of functionality; user authentication; efficient method of transport; secure dialogue; concentration and scalability; customer ease-of-use; IP address assignment; bandwidth management; accounting/billing; multiple ISP selection; and VPN capability.

The location of the functionality is of importance so that traffic can be reduced by eliminating data units without sufficient permission before they travel to the external network gateway. It is a concept of the DSM method of the invention that the subscriber management functionality is located at an access control node at the user network edge of the access network. In the preferred embodiment, this functionality is provided by the Integrated Access Device (IAD). The DSM method of the invention preferably takes the subscriber management functionality and distributes it across many IADs instead of centralizing it at the Service Provider.

A function of the DSM method is user authentication. DSM is a method of verifying that the user is authorized to use network resources or to access certain applications. At session start-up, a user on a user network initiates a connection to a system on an external network, the user is challenged to provide access control information (name or user identification and password). The authentication challenge can be one-time at session start-up, issued periodically, issued on a per data unit basis, or can be issued after session-timeout or interruption, at the discretion of the network administrators.

Figure 3:
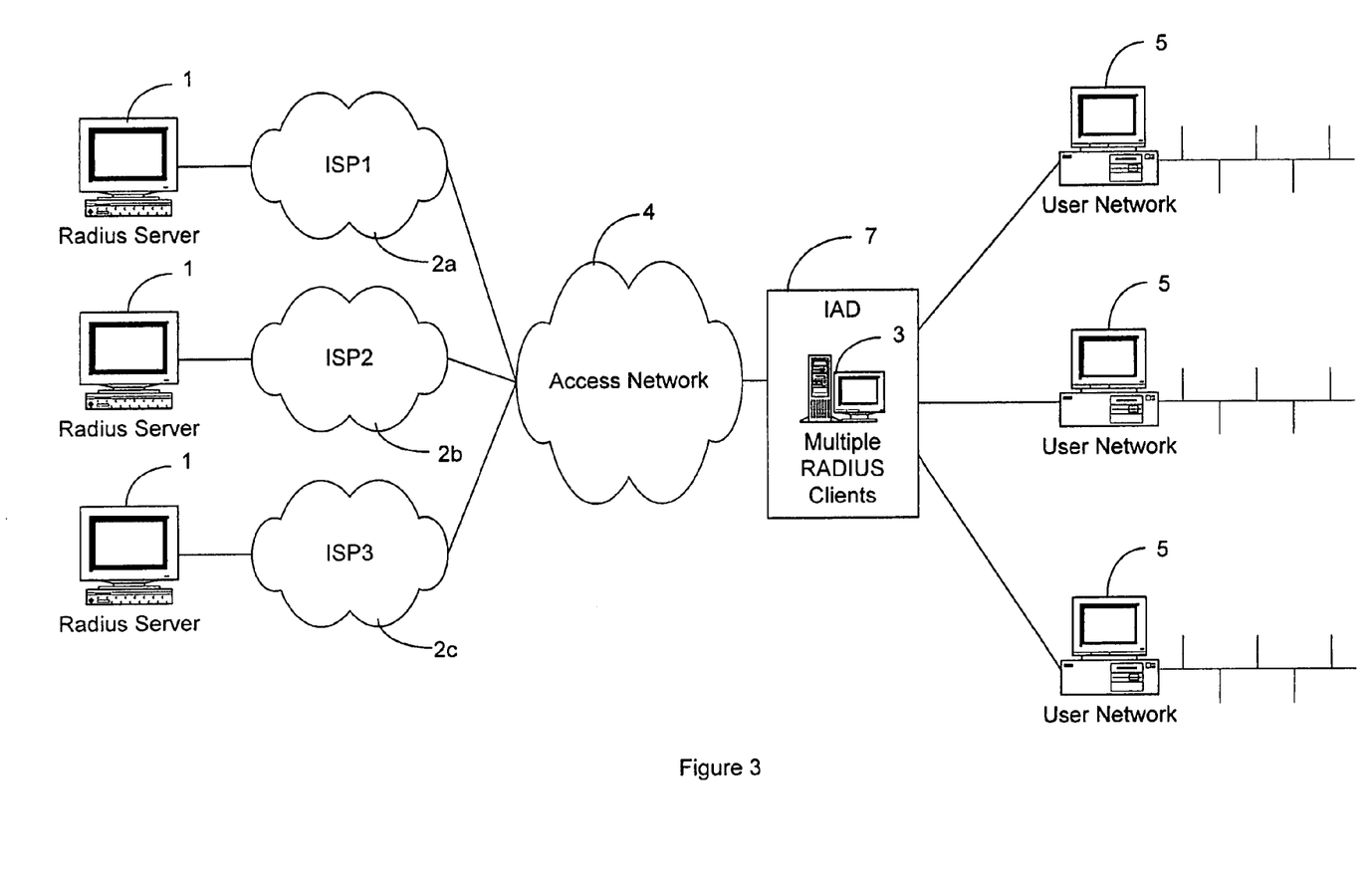
FIG. 3 is a schematic illustration of the presently preferred authorization system in accordance with the invention.
Figure 4:
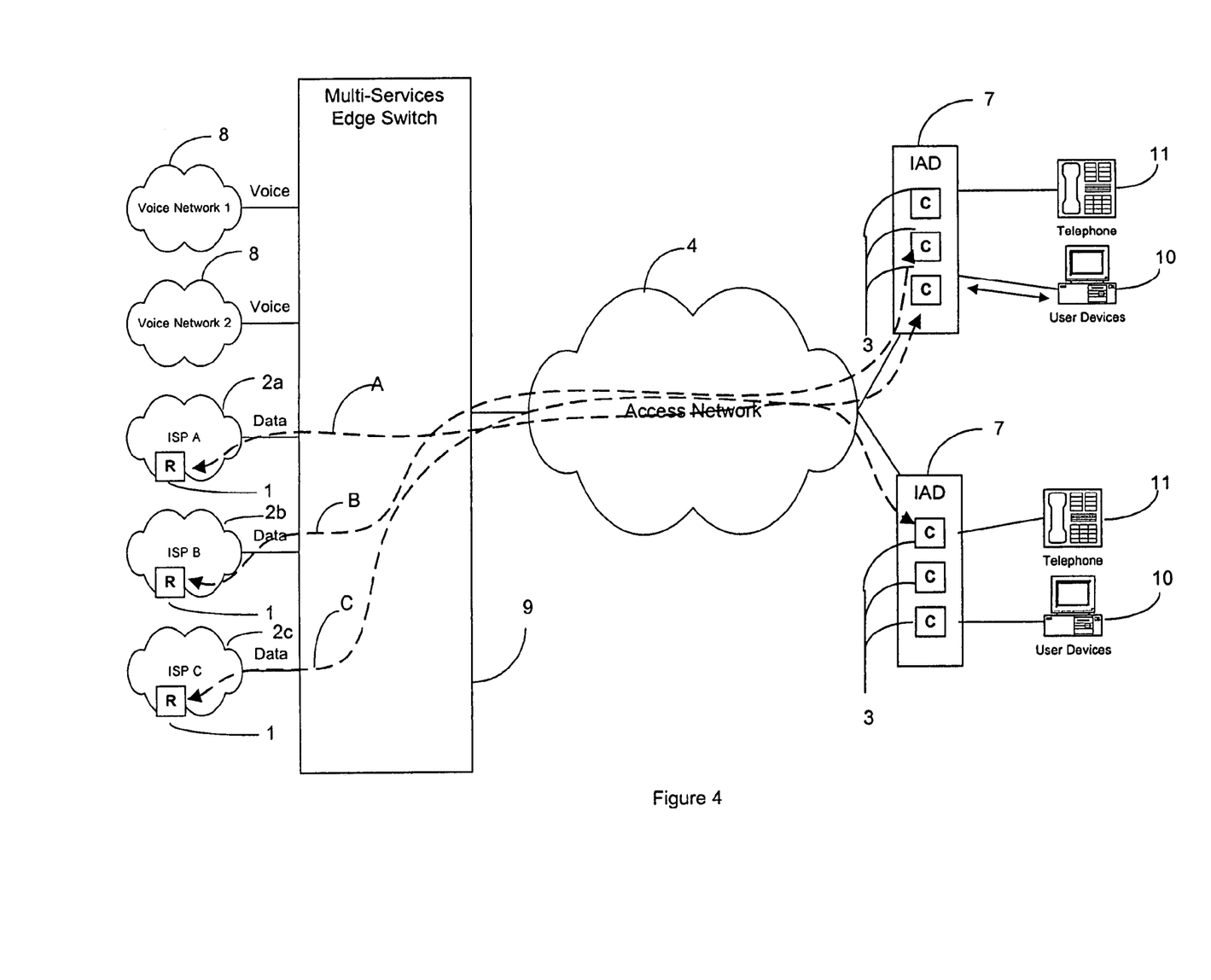
FIG. 4 is a schematic illustration of an application of the preferred DSM system of the invention in a mixed voice/data environment.

The operation of the presently preferred embodiment of the invention is illustrated in FIGS. 3 and 4. FIG. 3 depicts an exemplary network using the current invention. Here a RADIUS Server 1 is connected through an ISP 2a-2c to an Access Network 4. At the user network edge of the Access Network 4 is an Integrated Access Device (IAD) 7. Internal to the IAD 7 is a RADIUS client 3. The IAD 7 is placed between the Access Network 4 and a plurality of User Networks 5. This allows the RADIUS Client 3 in the IAD 7 to authorize all packets leaving the User Networks 5 before they traverse the Access Network 4. In addition, due to the manner in which the IAD is designed, all traffic leaving the LAD 7 is challenged for authorization, thus different User Networks 5 cannot inadvertently gain access to each other.

FIG. 4 depicts an exemplary embodiment of the invention being used in a mixed data/voice environment, where each of the different ISP networks require their own set of authorizations. Here both Voice Networks 8 and ISP data networks 2 are connected to a Services Interworking Platform (SIP) 9. The ISP networks 2 transmit and receive data signals, while the voice networks 8 transmit and receive voice messages. Each ISP network 2 has its own RADIUS Server 1 internal to the network. The SIP 9 is connected to both the Voice Networks 8 and the ISP networks 2 and provides them access to the Access Network 4. The Access Network is connected to the IAD 7, which has a plurality of RADIUS clients 3 internal to it. The IAD 7 allows the Access Network 4 to communicate with the telephony networks 11 and the User Devices 10. The IAD's plurality of RADIUS Clients 3 each establish a client/server relationship with one of the RADIUS Servers 1 so that they may perform AAA services on the packets that arises from both the telephony networks 11 and the User Devices 10. It should be noted for clarity that there need not be a direct relationship between the number of RADIUS clients 3 and the number of RADIUS servers 1 they connect to. The RADIUS clients 3 need not be dedicated to a particular RADIUS server 1 unless so desired by a system architect or a network administrator.

The IAD 7 can be represented by three basic elements, a user network interface, an authentication agent, and an external network interface. The user network interface is designed so that the IAD 7 can connect to the user networks 5. The external network interface connects to the external networks 2a-2c through the access network 4. The authentication agent is responsible for the authorisation, authentication and forwarding of packets, and communicates with authentication servers. Authentication servers authorise and authenticate access rights and user identity, and are typically represented by RADIUS servers.

Upon receiving a data unit from a user, the source Media Access Control (MAC) and/or IP address is verified in the IAD Forward Table against a list of authorized users. If authorized, the user data unit is marked by a data unit labelling system, sent across the access network to the egress edge and then forwarded to the destination provider. Session/interface states and statistics on session duration, number of packets/bytes sent/received and so on, can be collected by the IAD 7 and forwarded to the operator upon Command Line Interface (CLI) or Simple Network Management Protocol (SNMP) request.

If a particular user is not authorized to use a provider's domain, the IAD 7 challenges the user based on information received from the provider's RADIUS server 1. The user provides access control information to the IAD 7, which is forwarded to the RADIUS server 1. The RADIUS server 1 will respond with an authentication message. Once authenticated, the user data is allowed to flow through the access network 4 and SIP 9 to the destination service provider 2a-2c. The flow between the IAD 7 and the service provider network 2a-2c consists of pure data units, marked by a data unit labelling system, without any of the additional tunnel overhead incurred when using Point to Point Protocol over Ethernet (PPPoE) or Layer 2 Tunneling protocols (L2TP).

The IAD DSM module 7 is responsible for authentication, authorization and accounting as well as interacting with the user across the user dialogue protocol (e.g., PPPoE, L2TP, etc.). It processes access control information and builds a table of authorized user-to-Domain mappings which is consulted for each incoming packet. The table can be at least partly constructed with information from the provider's RADIUS server 1.

An efficient method of transport allows the reduction of data carried over the network starting at the user device 10, flowing towards the IAD 7 and then on to the external network 2a-2c through the access network 4. There are many methods of carrying user sessions from user device to the IAD 7. Methods known in the art include the numerous encapsulation choices for transporting user data including: IP over PPP over dial-up; IP over PPP over ISDN; IP over PPP over Ethernet (PPPoE); IP over PPP over Frame Relay (PPPoF); IP over PPP over ATM (PPPoA); IP over PPP over UDP/IP (L2TP); IP over PPP over IP (L2F); IP over PPP over IPSec (VPN); as well as any number of proprietary encapsulation techniques. As is apparent, public, or non-proprietary, methods share the use of PPP to carry subscriber management information. Traditionally these methods have been used to transport the user PPP session across the access network. This contributes significantly to the protocol overhead in the process and increases traffic across the Access Network. In the presently preferred embodiment, this invention uses the PPPoE or L2TP protocols between the IAD 7 and user device 10. These protocols do not extend over the access network 4 thus reducing the overhead that these techniques apply to the data units.

The IAD 7 is charged with performing user authentication and communicates with the RADIUS server 1 becoming in effect a RADIUS client 3. If the IAD 7 supports multiple destination networks (i.e., multiple Virtual Private Networks), then multiple RADIUS clients 3 can be supported. The communication of authentication information across the access network 4 can be secured to avoid the discovery of user names and passwords through the use of snooping techniques. Thus, to provide secure dialogue security transactions between the IAD RADIUS client 3 and RADIUS server 1 are authenticated through the use of a shared secret code, which is never sent over the network. Access control information can be encrypted using industry standard encryption technologies, such as MD5, when sent between the client 3 and RADIUS server 1, to eliminate the possibility of password compromise.

To secure data units that are accidentally released to the wrong network a data security system is preferably implemented so as to prevent these errant data units from being decoded. Numerous techniques of data unit labelling can be applied to solve this so that data units that are not intended for a given network are never read by it. A data unit labelling scheme that can render a data unit illegible to foreign devices while in transit across the access network, while at the same time introducing no overhead is presently preferred for use with this invention. This data unit marking process must be undone at the egress edge of the access network 4 so that data units can be restored for delivery to the ISP or corporate router The method of the present invention is illustrated, in exemplary form, in FIG. 5. The process starts in step 100 when an access node, such as the IAD, receives a data unit from a user network. The access node examines the destination of the data unit and determines whether the access rights to the destination network need to be authenticated in step 102. If no authentication is required, the data unit may be transmitted in step 108. If authentication of access rights to the destination network is required, authentication of the access rights is obtained in step 104. A detailed example of the authentication of access rights is provided in FIG. 6, and will be described later. A determination of the authenticated access rights is made at step 106. If the authentication failed then the data unit may be dropped in step 110. If the authentication was successful the data unit is transmitted in step 108, and the method returns to step 100.

Figure 6:
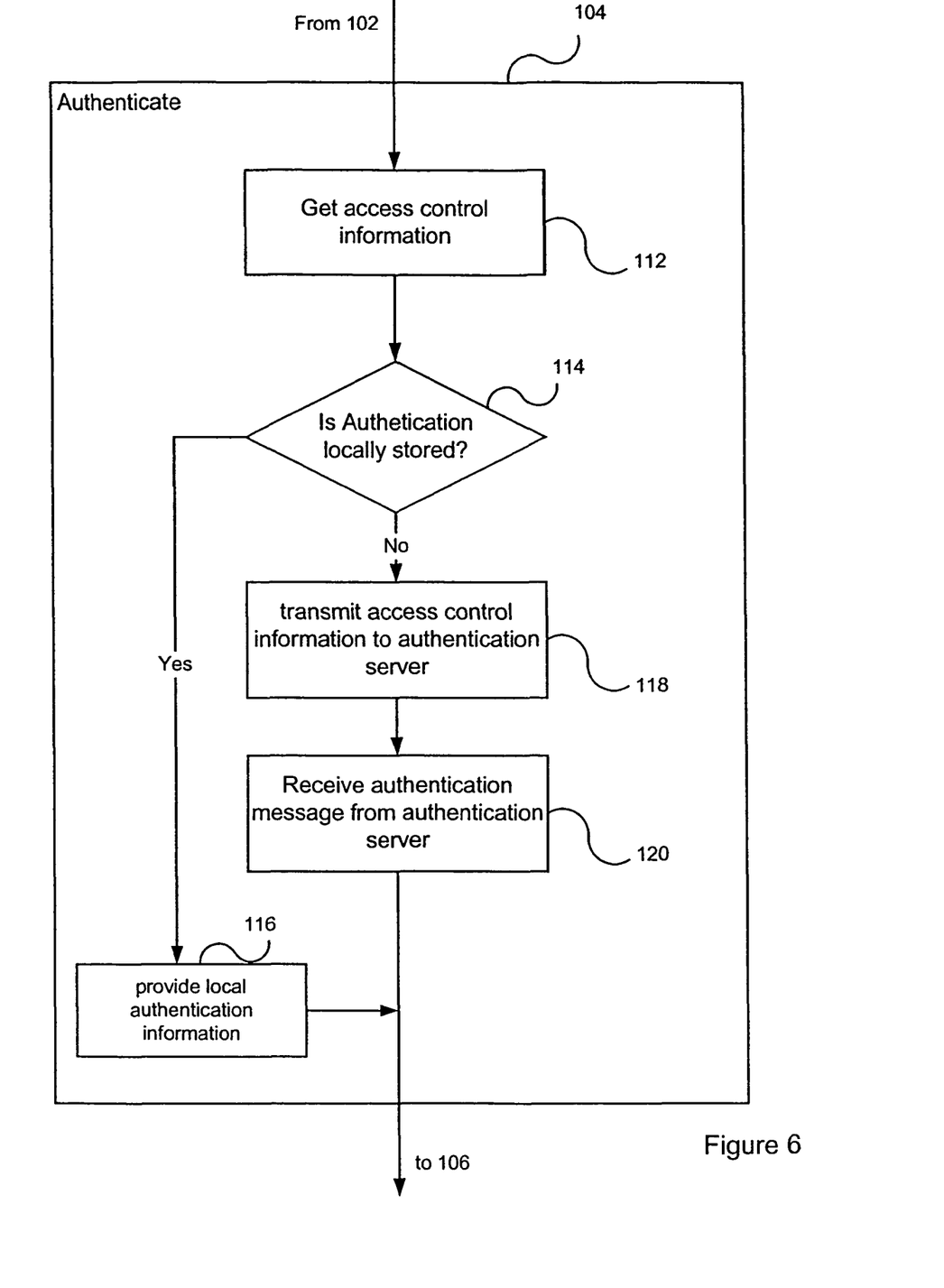
FIG. 6 is an overview of an authorization method used in conjunction with the present invention.

FIG. 6 illustrates an exemplary method of authentication that can be used in step 104. Upon beginning the authentication process, access control information is obtained in step 112. The access node checks a local cache or table of authenticated information in step 114 to see if the authentication can be provided locally. If the authentication can be provided locally then the locally provided authentication is forwarded to step 106 in step 116. By providing locally stored authentication in this manner, the access node reduces latency times for data unit transit, and also reduces the amount of data that is transmitted over an access network to a remote authentication server. If authentication information is not stored locally, access control information is transmitted to a remote authentication server in step 118. The remote authentication server transmits an authorization message to the access control node in step 120. The communications between the access control node and the remote authorization server can optionally be encrypted for security. The information from either step 116 or step 120 is then provided to step 106.

The locally stored information accessed in step 116 can be added to upon each communication with the remote authentication server. Thus the contents of this local resource can serve as a cache for the remote network. The local information can optionally be given a timestamp or other information so that the remote server can have the access control node remove information when predetermined conditions are met. This allows the information in the access control node to expire after a period of inactivity for example.

The access control information obtained in step 112 can include user identification and password information, and can further include network address values. After an initial connection requiring user identification and password information for authorization, the access control node can assume that further data units from that network address are from the same user so long as the contents of the locally stored authentication information has not expired.

The presently preferred embodiment of the invention as described so far can be considered both scalable and concentrated. The IAD is connected to a number of users networks, and is thus able to serve a large number of individual users from a central location, this gives it concentration. Additionally, since the IAD serves a number of networks it is possible to introduce a second IAD to a location and simply shift some of the networks from the first IAD to the second, this allows an IAD to be used until it is near capacity and then provides a simple scaling path to support more users. A high concentration of users is considered important for the service provider to make a viable business case. In today's world of cut-rate Internet access, service providers must groom many hundreds or thousands of subscribers onto one high-speed data stream. The ISP or corporate router should not be troubled with managing these many user sessions while trying to route incoming data units at say, DS3 (45 MBPS) or OC3 (155 MBPS) wire rate.

Scalability is a potential problem for products that perform subscriber management in a box located at the ISP end of the access network. This has been addressed with the present invention, where subscriber management is preferably distributed across multiple IADs 7, each IAD 7 only having to manage at most, 1 or 2 dozen subscribers. This means that if a given subscriber increases their load, and requires more resources at the IAD 7 it is possible to add or upgrade a single unit that affects a small part of the user base as opposed to upgrading a centralized unit and inconveniencing all users of the system during the upgrade process. Conventional systems lack either the scalability or the concentration of the IAD. AAA systems need not be scaled in the same manner because they serve a single network, and are thus not concentrated. Conventional RADIUS clients, though concentrated, are difficult to scale because each user attempting the access the external network accesses the RADIUS client as a gateway. Simply adding a second gateway will not allow for proper load balancing or load sharing, as users must change the previously specified gateway if they want to access the second RADIUS client. Expensive load balancing systems can be applied to solve this problem, but typically they are difficult to design and maintain.

With the preferred embodiment of this invention, subnet and mask information are tied to a Domain which appears as a logical RAS module. IP host numbers can then be dynamically assigned to users as they connect. Typically each user network connected to the IAD will have a different subnet address, so that requests that stay on the network are easily identified, and that requests destined for other networks are easily routed. The subnet mask information, as would be known to a person skilled in the art, is a code resembling a network address, that when bitwise logically AND'ed with a network address results in the subnet address.

The DSM system in accordance with the invention allows providers to sell services based on guaranteed bit rates by allocating discrete bandwidth levels to individual users and enforcing the bandwidth through bandwidth management techniques. These bandwidth management techniques can be used to enforce service level agreements that access providers have with the user networks. Typically, the user network interface of the IAD is designed to offer different levels of bandwidth availability to the different networks. For example, an IAD connecting three networks, may guarantee the first network two megabits per second of bandwidth, but allow up to three megabits per second if capacity allows; the second network may be guaranteed a bandwidth of one megabit per second, with a maximum permitted bandwidth of four megabits per second; and the third network may be allocated a minimum of one and a half megabits per second with no defined maximum capacity. Enforcing such a level of service, with the discrete bandwidth limits can be carried out through methods known in, and common to, the art.

Service providers require resource accounting to bill users or to prove service levels have been met by the network/system. A service provider is likely to use RADIUS access control and accounting software defined by RFC 2139 to meet these special needs. RADIUS accounting is independent of RADIUS authentication or authorization. RADIUS accounting allows reports to be sent at the start and end of services, indicating the amount of resources (e.g. session duration, data transferred, etc.) used during the session. It is possible for an ISP to use Simple Network Management Protocol (SNMP)-based statistics collected by the IAD for the above purposes. An SNMP management station periodically 'polls' the IAD SNMP agent to upload the accumulated statistics. Neither of these technologies is incompatible with the implementation described.

The present invention can provide the ability of a client network to select from a number of ISPs. Multiple ISP selection has not traditionally been regarded as an ability of networks but is now seen as a necessary feature for products providing access network services. The user has the capability of switching between destination ISPs or corporations via the DSM service. This service is possible through the IAD because the IAD is designed to connect to numerous network services, whereas in the prior art systems access devices were designed for communication with specific networks. The IAD is able to interface with and act as an authentication agent for numerous networks, thus allowing the user network to connect to any of the supported networks.

Through the implementation of both this invention and a secure data unit labelling system it is possible to enable Virtual Private Networking, as will be apparent to those of skill in the art. Once authenticated by DSM and marked by the data unit labelling, data units are secure until they reach the egress interface of the network.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method of distributed subscriber management in a data network, the method comprising:
   receiving, at an integrated access device interposed between a plurality of user networks and an access network, data units from said plurality of user networks;
   authenticating, at said integrated access device, user data received from said plurality of user networks, by means of a plurality of shared authentication clients residing in said integrated access device, prior to transmitting said user data through said access network;
   allocating, by said integrated access device, discrete bandwidth levels to individual user networks from among said plurality of user networks;
   enforcing, by said integrated access device, said discrete bandwidth levels;
   collecting, by said integrated access device, statistics on traffic traversing said access network; and
   controlling access between said user networks.

2. The method of claim 1 further comprising sending from said integrated access device at least one of said data units through said access network to an authentication server associated with an external network from among a plurality of external networks.

3. The method of claim 2 further comprising a step of encrypting said at least one of said data units prior to said transmitting.

4. The method of claim 2 further comprising using a Remote Authentication Dial-In User Service (RADIUS) protocol for communication between said authentication clients and said authentication server.

5. The method of claim 2 further comprising a step of receiving, at said integrated access device, from said authentication server, authentication information via said access network.

6. The method of claim 5 further comprising employing a memory device for storing said authentication information.

7. The method of claim 6 further comprising:
   receiving access control information from any of data devices;
   determining availability of relevant authentication information, in said memory device, pertinent to said access control information; and
   communicating with a respective authentication server from among a plurality of authentication servers for acquiring authentication information corresponding to said access control information, subject to unavailability of said relevant authentication information in said memory device.

8. The method of claim 7, further comprising employing, by said plurality of authentication clients, at least one of:
   a password authentication protocol client;
   a challenge handshake authentication protocol client;
   a terminal-access controller-access control system client; and
   a remote authentication dial-in user service protocol client.

9. The method of claim 7 further comprising using shared secret codes for secure communications between said integrated access device and said plurality of authentication servers.

10. The method of claim 1 further comprising using said statistics to ascertain compliance with preset service levels.

11. The method of claim 10 wherein said statistics comprise session durations and amounts of data authorized by said integrated access device.

12. The method of claim 1 further comprising a step of prompting a user initiating a connection session, from a user network, to provide access control information, wherein said prompting is issued according to at least one of the following disciplines:
   at session start;
   periodically;
   per data unit;
   after session time-out; and
   after session interruption.

13. A distributed subscriber management system for controlling access of a plurality of user networks to a plurality of external networks, where each user network connects to a respective group of users, the system comprising:
- a plurality of authentication servers each coupled to one of said external networks; and
- a plurality of integrated access devices each integrated access device interposed between a respective subset of said user networks and an access network, said each integrated access device comprising:
  - a user-network interface for receiving data units from said respective subset of user networks;
  - a plurality of authentication clients for authenticating data units received from users of said respective subset of user networks and destined to at least one of said external networks;
  - means for controlling admission to each user network of said respective subset of user networks;
  - means for allocating discrete bandwidth values from said respective subset of user networks to at least one external network; and
  - an external-network interface coupled to said plurality of authentication clients and to said access network, said external-network interface forwarding data units authorized by any authentication client of said plurality authentication clients to a respective external network from among said plurality of external networks.

14. The distributed subscriber management system of claim 13 wherein said integrated access devices further comprise:
- means for enforcing service level agreements; and
- means for collecting statistics on session durations and amounts of data authorized by said plurality of integrated access devices.

15. The distributed subscriber management system of claim 14 further comprising a management station for polling said plurality of integrated access devices to upload said statistics.

16. The distributed subscriber management system of claim 13 wherein at least one of said integrated access devices further comprises means for selecting a destination external network from among said plurality of external networks.

17. The distributed subscriber management system of claim 13 wherein said means for allocating discrete bandwidth values is integrated with said user-network interface.

* * * * *